US010460383B2

(12) United States Patent
Jones-McFadden et al.

(10) Patent No.: US 10,460,383 B2
(45) Date of Patent: Oct. 29, 2019

(54) SYSTEM FOR TRANSMISSION AND USE OF AGGREGATED METRICS INDICATIVE OF FUTURE CUSTOMER CIRCUMSTANCES

(71) Applicant: BANK OF AMERICA CORPORATION, Charlotte, NC (US)

(72) Inventors: Alicia C. Jones-McFadden, Fort Mill, SC (US); Matthew Hsieh, Charlotte, NC (US); Scott R. Enscoe, Charlotte, NC (US); Elizabeth Ann Miller, Brooklyn, NY (US); Alicia Anli Salvino, Rockville, MD (US); Daniel Shilov, Nashua, NH (US); Michael Anderson, Colleyville, TX (US); Raghav Anand, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 298 days.

(21) Appl. No.: 15/288,819

(22) Filed: Oct. 7, 2016

(65) Prior Publication Data
US 2018/0101568 A1    Apr. 12, 2018

(51) Int. Cl.
*G06Q 40/02* (2012.01)

(52) U.S. Cl.
CPC .................................. *G06Q 40/02* (2013.01)

(58) Field of Classification Search
CPC ....................................................... G06Q 40/02
(Continued)

(56) References Cited

U.S. PATENT DOCUMENTS 5,864,684 A    1/1999 Nielson
5,918,217 A    6/1999 Maggioncalda et al.
(Continued)

FOREIGN PATENT DOCUMENTS

CA    2626172 A1    11/2009
CA    2629653 A1    11/2009
(Continued)

OTHER PUBLICATIONS

Egele, Manuel, et al., "COMPA: Detecting Compromised Accounts on Social Networks", NDSS 2013, San Diego, CA, Feb. 24-27, 3013, 17 pages.*
(Continued)

*Primary Examiner* — Robert Stevens
(74) *Attorney, Agent, or Firm* — Michael A. Springs; Moore & Van Allen PLLC; Nicholas C. Russell

(57) ABSTRACT

A network communication interface and a memory device storing an anomaly application and a resource application are provided. A processing device is operatively coupled to the memory device, wherein the processing device is configured to execute computer-readable program code to: determine the existence of an anomalous situation for a user; initiate the anomaly application to acquire aggregated metrics from third parties associated with the anomalous situation; and analyze the anomalous situation using the aggregated information. The aggregated metrics may be obtained from the entity system and/or from a third party system. The aggregated metrics may comprise the historical financial record of a plurality of third parties. The aggregated metrics may be obtained by searching a datastore of the entity system for relevant information from a historical record of unrelated individuals.

16 Claims, 8 Drawing Sheets

(58) Field of Classification Search
USPC .......................................................... 707/706
See application file for complete search history.

(56) References Cited

U.S. PATENT DOCUMENTS

| | | | |
|---|---|---|---|
| 6,012,044 A | 1/2000 | Maggioncalda et al. | |
| 6,278,993 B1 | 8/2001 | Kumar et al. | |
| 6,327,578 B1 | 12/2001 | Linehan | |
| 6,629,081 B1* | 9/2003 | Cornelius | G06Q 20/04 705/30 |
| 6,633,910 B1 | 10/2003 | Rajan et al. | |
| 6,782,374 B2 | 8/2004 | Nichols | |
| 6,829,334 B1 | 12/2004 | Zirngibl et al. | |
| 6,892,192 B1 | 5/2005 | Geddes et al. | |
| 7,085,834 B2 | 8/2006 | Delany et al. | |
| 7,092,992 B1 | 8/2006 | Yu | |
| 7,103,556 B2* | 9/2006 | Del Rey | G06Q 40/00 705/36 R |
| 7,165,041 B1 | 1/2007 | Guheen et al. | |
| 7,296,734 B2 | 11/2007 | Pliha | |
| 7,363,339 B2 | 4/2008 | Delany et al. | |
| 7,364,071 B2 | 4/2008 | Esplin et al. | |
| 7,406,537 B2 | 7/2008 | Cullen | |
| 7,412,534 B2 | 8/2008 | Tsang et al. | |
| 7,444,304 B2 | 10/2008 | Mellinger et al. | |
| 7,486,780 B2 | 2/2009 | Zirngibl et al. | |
| 7,624,073 B1 | 11/2009 | Robinson et al. | |
| 7,672,879 B1 | 3/2010 | Kumar et al. | |
| 7,698,190 B2 | 4/2010 | Penkalski et al. | |
| 7,774,257 B2 | 8/2010 | Maggioncalda et al. | |
| 7,788,147 B2 | 8/2010 | Haggerty et al. | |
| 7,797,267 B2 | 9/2010 | Horvitz | |
| 7,813,989 B2 | 10/2010 | Jones et al. | |
| 7,860,774 B1 | 12/2010 | Peterson et al. | |
| 7,912,770 B2 | 3/2011 | Haggerty et al. | |
| 8,060,423 B1 | 11/2011 | Rukonic et al. | |
| 8,073,759 B1 | 12/2011 | Del Favero et al. | |
| 8,122,123 B2* | 2/2012 | Bhattacharya | G06Q 10/06 709/224 |
| 8,135,655 B2 | 3/2012 | Oaten et al. | |
| 8,260,699 B2 | 9/2012 | Smith et al. | |
| 8,306,894 B2 | 11/2012 | Newman et al. | |
| 8,346,568 B1 | 1/2013 | Del Favero et al. | |
| 8,396,791 B2 | 3/2013 | Cotton | |
| 8,407,137 B2 | 3/2013 | Thomas | |
| 8,429,038 B1 | 4/2013 | Harman et al. | |
| 8,473,380 B2 | 6/2013 | Thomas et al. | |
| 8,494,936 B2 | 7/2013 | Brenner | |
| 8,594,283 B2 | 11/2013 | Hogan et al. | |
| 8,639,567 B2 | 1/2014 | Winters | |
| 8,639,638 B2 | 1/2014 | Shae et al. | |
| 8,682,793 B2 | 3/2014 | Carlson et al. | |
| 8,713,090 B2 | 4/2014 | Sadovsky et al. | |
| 8,719,132 B1 | 5/2014 | Diggdon et al. | |
| 8,732,073 B2 | 5/2014 | Thomas | |
| 8,768,736 B1 | 7/2014 | Chapman et al. | |
| 8,768,800 B2 | 7/2014 | Milosavljevic et al. | |
| 8,768,833 B2 | 7/2014 | Freishtat et al. | |
| 8,788,661 B2 | 7/2014 | Raleigh | |
| 8,825,759 B1 | 9/2014 | Jackson et al. | |
| 8,930,217 B2 | 1/2015 | Feinschreiber et al. | |
| 8,935,342 B2 | 1/2015 | Patel | |
| 9,098,387 B1 | 8/2015 | Curtis et al. | |
| 9,256,876 B2 | 2/2016 | Vasant Akole et al. | |
| 9,286,637 B1 | 3/2016 | Keld et al. | |
| 9,411,942 B2 | 8/2016 | Commons et al. | |
| 9,460,443 B1 | 10/2016 | Curtis et al. | |
| 2002/0174185 A1 | 11/2002 | Rawat et al. | |
| 2002/0180786 A1 | 12/2002 | Tanner | |
| 2003/0120593 A1 | 6/2003 | Bansal et al. | |
| 2003/0139986 A1 | 7/2003 | Roberts, Jr. | |
| 2003/0206554 A1 | 11/2003 | Dillon | |
| 2004/0138959 A1 | 7/2004 | Hlavac et al. | |
| 2004/0153413 A1 | 8/2004 | Gross | |
| 2004/0162773 A1* | 8/2004 | Del Rey | G06Q 40/00 705/36 R |
| 2004/0175680 A1 | 9/2004 | Hlavac et al. | |
| 2004/0181591 A1 | 9/2004 | Yu et al. | |
| 2004/0189702 A1 | 9/2004 | Hlavac et al. | |
| 2005/0187862 A1* | 8/2005 | Dheer et al. | G06F 17/30899 705/39 |
| 2006/0014535 A1 | 1/2006 | Walker et al. | |
| 2006/0224046 A1 | 10/2006 | Ramadas et al. | |
| 2006/0265201 A1 | 11/2006 | Martin | |
| 2007/0021200 A1 | 1/2007 | Fox et al. | |
| 2007/0112906 A1 | 5/2007 | Liu et al. | |
| 2007/0167689 A1 | 7/2007 | Ramadas et al. | |
| 2007/0174448 A1 | 7/2007 | Ahuja et al. | |
| 2007/0286099 A1 | 12/2007 | Stocklein et al. | |
| 2008/0014908 A1 | 1/2008 | Vasant | |
| 2008/0034045 A1 | 2/2008 | Bardsley | |
| 2008/0133734 A1 | 6/2008 | Jacobs et al. | |
| 2009/0024984 A1 | 1/2009 | Maeda | |
| 2009/0106171 A1 | 4/2009 | Hlavac et al. | |
| 2009/0124349 A1 | 5/2009 | Dawson et al. | |
| 2009/0132395 A1 | 5/2009 | Lam et al. | |
| 2009/0276288 A1 | 11/2009 | Hlavac et al. | |
| 2010/0017619 A1 | 1/2010 | Errico | |
| 2010/0100470 A1* | 4/2010 | Buchanan | G06Q 10/10 705/35 |
| 2010/0121808 A1 | 5/2010 | Kuhn | |
| 2010/0257066 A1 | 10/2010 | Jones et al. | |
| 2010/0299252 A1* | 11/2010 | Thomas | G06Q 20/10 705/39 |
| 2010/0306080 A1 | 12/2010 | Trandal et al. | |
| 2010/0325047 A1 | 12/2010 | Carlson et al. | |
| 2010/0332373 A1 | 12/2010 | Crabtree et al. | |
| 2011/0066505 A1 | 3/2011 | Hammad | |
| 2011/0106775 A1 | 5/2011 | Arbo et al. | |
| 2011/0131130 A1* | 6/2011 | Griffin | G06Q 40/00 705/38 |
| 2011/0213686 A1 | 9/2011 | Ferris et al. | |
| 2012/0010933 A1* | 1/2012 | Satyavolu | G06Q 30/0215 705/14.17 |
| 2012/0016858 A1 | 1/2012 | Rathod | |
| 2012/0122570 A1 | 5/2012 | Baronoff | |
| 2012/0173700 A1 | 7/2012 | De Andrade Cajahyba et al. | |
| 2012/0179564 A1 | 7/2012 | Soroca et al. | |
| 2012/0185368 A1 | 7/2012 | Schloter et al. | |
| 2012/0197794 A1 | 8/2012 | Grigg et al. | |
| 2012/0215640 A1 | 8/2012 | Ramer et al. | |
| 2012/0221446 A1 | 8/2012 | Grigg et al. | |
| 2012/0330971 A1 | 12/2012 | Thomas et al. | |
| 2013/0041819 A1 | 2/2013 | Khasho | |
| 2013/0054681 A1 | 2/2013 | Coyne | |
| 2013/0176908 A1 | 7/2013 | Baniel et al. | |
| 2013/0227027 A1 | 8/2013 | May et al. | |
| 2013/0325598 A1* | 12/2013 | Shao | G06Q 30/02 705/14.49 |
| 2013/0325681 A1* | 12/2013 | Somashekar | G06Q 40/00 705/35 |
| 2014/0025491 A1* | 1/2014 | Nagarajan | G06Q 30/0207 705/14.53 |
| 2014/0136381 A1* | 5/2014 | Joseph | G06Q 40/02 705/35 |
| 2014/0172560 A1* | 6/2014 | Satyavolu | H04M 15/805 705/14.53 |
| 2014/0207584 A1 | 7/2014 | Wicha et al. | |
| 2014/0236846 A1 | 8/2014 | Melika et al. | |
| 2014/0279800 A1 | 9/2014 | Anastasopoulos | |
| 2014/0335819 A1 | 11/2014 | Jahr | |
| 2014/0365354 A1* | 12/2014 | Shvarts | G06Q 40/02 705/38 |
| 2015/0046307 A1 | 2/2015 | Calman et al. | |
| 2015/0079929 A1 | 3/2015 | McNamee et al. | |
| 2015/0082458 A1 | 3/2015 | Cooper et al. | |
| 2015/0095132 A1* | 4/2015 | Van Heerden | G06Q 40/06 705/14.32 |
| 2015/0161671 A1 | 6/2015 | Watkeys | |
| 2015/0351075 A1 | 12/2015 | Korver et al. | |
| 2015/0379582 A1 | 12/2015 | Jain et al. | |
| 2016/0034834 A1* | 2/2016 | Snell | G06F 17/30657 705/7.22 |
| 2016/0198322 A1 | 7/2016 | Pitis | |

(56) References Cited

U.S. PATENT DOCUMENTS

| | | | |
|---|---|---|---|
| 2016/0267597 A1* | 9/2016 | Johansen | G06Q 40/06 |
| 2016/0353237 A1 | 12/2016 | Shepherd et al. | |
| 2016/0353386 A1 | 12/2016 | Sasidharan et al. | |
| 2016/0379107 A1 | 12/2016 | Li et al. | |
| 2017/0013440 A1 | 1/2017 | Ostling | |
| 2017/0078861 A1 | 3/2017 | McNamee et al. | |
| 2018/0018158 A1 | 1/2018 | Kalke et al. | |
| 2018/0063018 A1 | 3/2018 | Bosch et al. | |

FOREIGN PATENT DOCUMENTS

| | | | |
|---|---|---|---|
| CA | 2634626 A1 | 1/2010 | |
| CN | 103677488 A | 3/2014 | |
| WO | 2004023451 A1 | 3/2004 | |
| WO | 2006107799 A1 | 10/2006 | |
| WO | 2007014201 A2 | 2/2007 | |
| WO | 2008072255 A2 | 6/2008 | |
| WO | 2008076997 A1 | 6/2008 | |
| WO | WO 2010/045059 A1 * | 4/2010 | G06Q 40/00 |
| WO | WO 2011/068791 A1 * | 6/2011 | G06Q 40/00 |
| WO | 2014153128 A1 | 9/2014 | |
| WO | 2014157891 A1 | 10/2014 | |
| WO | 2014200692 A1 | 12/2014 | |

OTHER PUBLICATIONS

Merriam Webster's Collegiate Dictionary, 10th Edition, Merriam-Webster, Incorporated, Springfield, MA, © 2000, p. 47.*

* cited by examiner

SYSTEM FOR TRANSMISSION AND USE OF AGGREGATED METRICS INDICATIVE OF FUTURE CUSTOMER CIRCUMSTANCES

BACKGROUND

Systems are known that monitor a user's current situation and provide analysis of the user's situation based on known parameters relating to the user. Such systems are limited in that situations of the user that may not conform to the current available information for the user are not adequately incorporated into the analysis based on the known parameters.

BRIEF SUMMARY

The following presents a simplified summary of one or more embodiments of the invention in order to provide a basic understanding of such embodiments. This summary is not an extensive overview of all contemplated embodiments. Its purpose is to present concepts of one or more embodiments in a simplified form as a prelude to the more detailed description that is presented later.

In some embodiments an entity system comprises a network communication interface and a memory device storing an anomaly utilization application and a resource application. A processing device is operatively coupled to the memory device, wherein the processing device is configured to execute computer-readable program code to: determine the existence of an anomalous situation for a user; initiate the anomaly utilization application to acquire aggregated metrics from third parties associated with the anomalous situation; and analyze the anomalous situation using the aggregated information.

The aggregated metrics may be obtained from the entity system and/or from a third party system. The anomalous situation may be transmitted to the entity system. The entity system may be a financial institution system. The anomalous situation may define the set of individuals that are similarly situated to the user. The anomalous situation may be a singular occurrence related to the user. The anomalous situation may comprise at least one of a change in income, a change in assets, a change in expenses, and a physical move of the user. The aggregated metrics may comprise the historical financial record of a plurality of third parties. The aggregated metrics may be unrelated to the user's current situation. The aggregated metrics may be obtained by searching a datastore of the entity system for relevant information from a historical record of unrelated individuals.

In some embodiments a method for monitoring utilization and optimizing a resource comprises: determining the existence of an anomalous situation for a user; acquiring aggregated metrics from third parties about the anomalous situation; analyzing the anomalous situation using the aggregated information.

The method may further comprise obtaining the aggregated metrics from the entity system. The method may further comprise obtaining the aggregated metrics from a third party system. The method may further comprise receiving the anomalous situation at the entity system. The entity system may be a financial institution system. The method may further comprise defining a set of individuals that are similarly situated to the user based on the anomalous situation. The anomalous situation may comprise at least one of a change in income, a change in assets, a change in expenses, and a physical move of the user. The aggregated metrics may comprise the historical financial record of a plurality of third parties. The method may further comprise obtaining the aggregated metrics by searching a datastore of the entity system for relevant information from a historical record of unrelated individuals.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
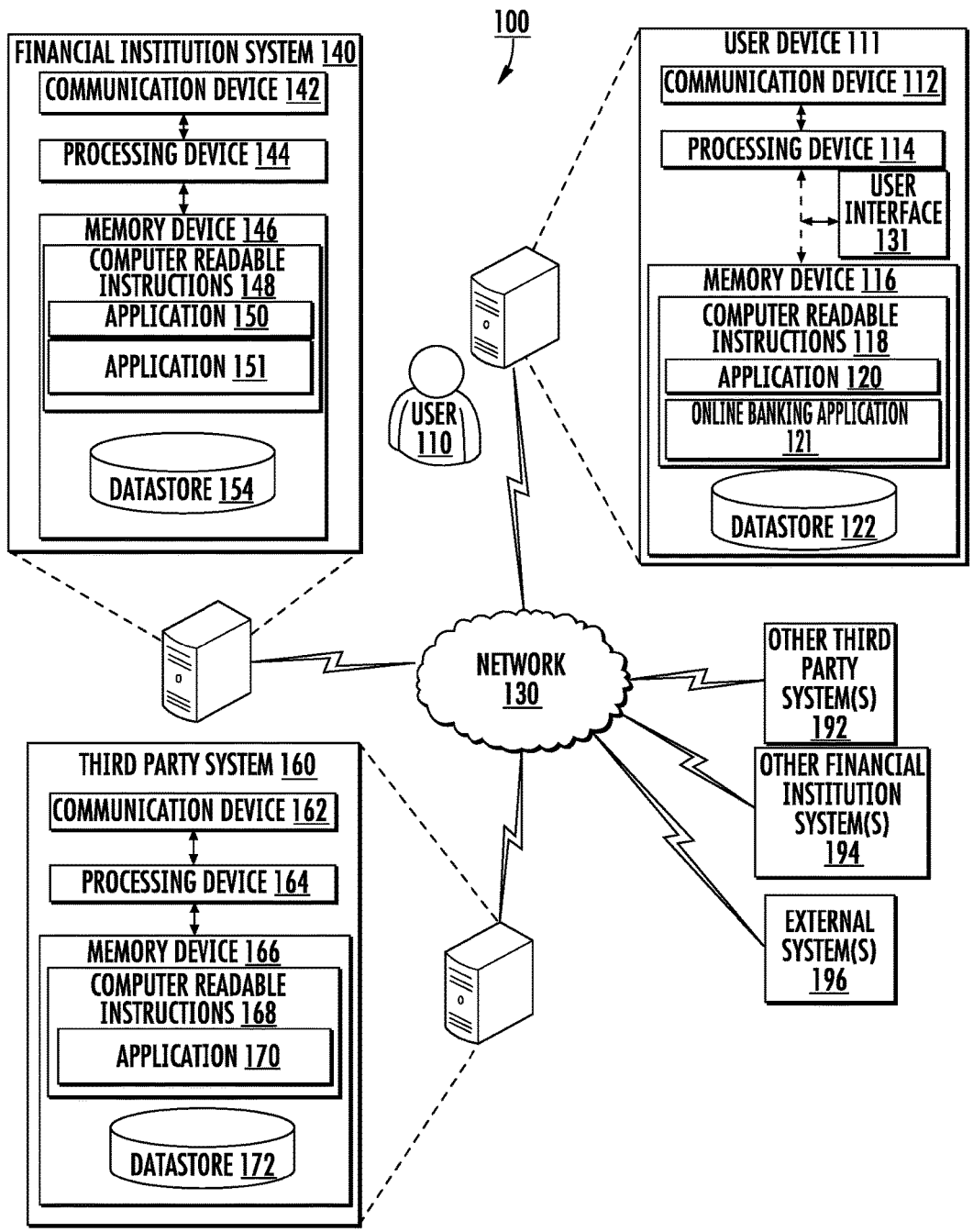
Figure 2A:
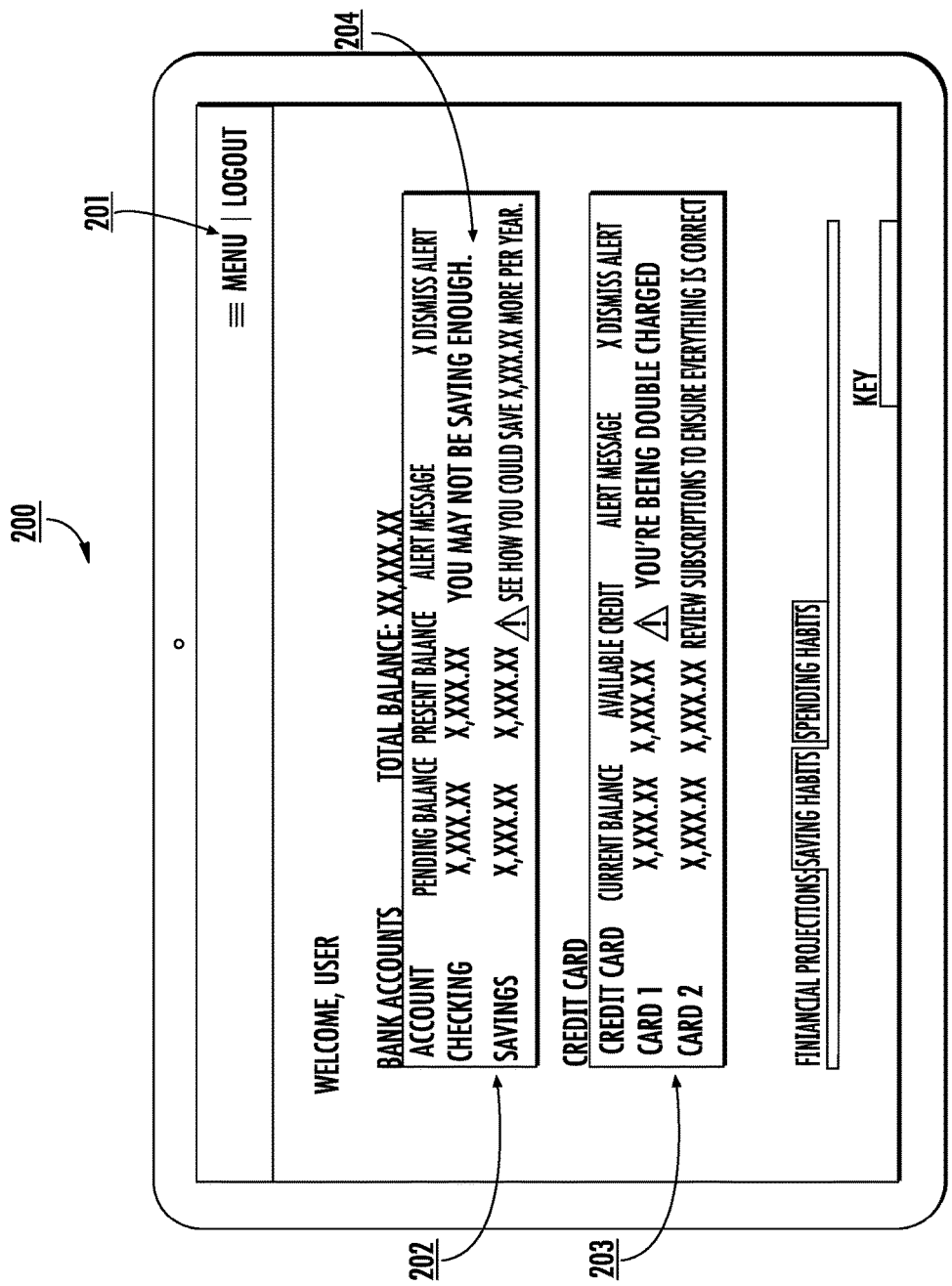
Figure 2B:
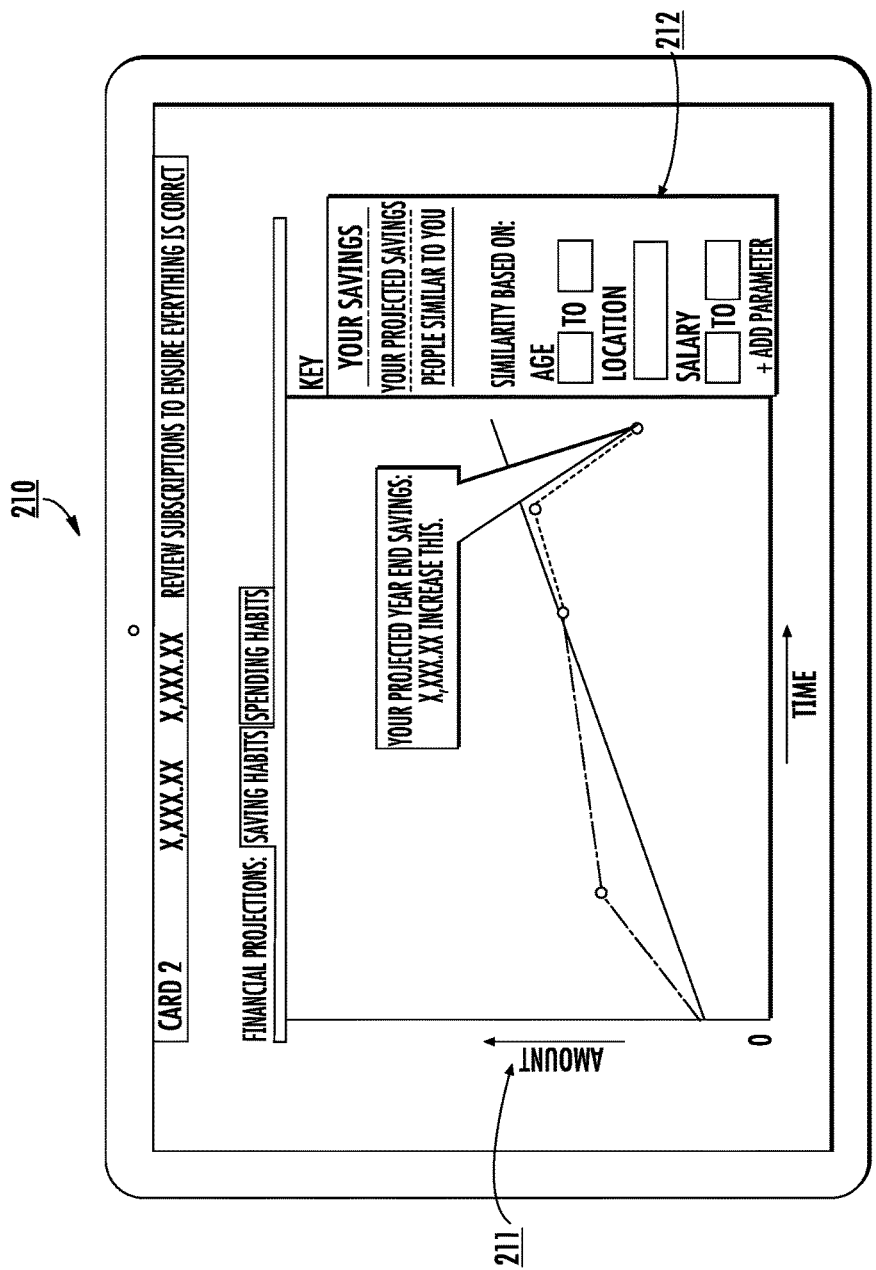
Figure 2C:
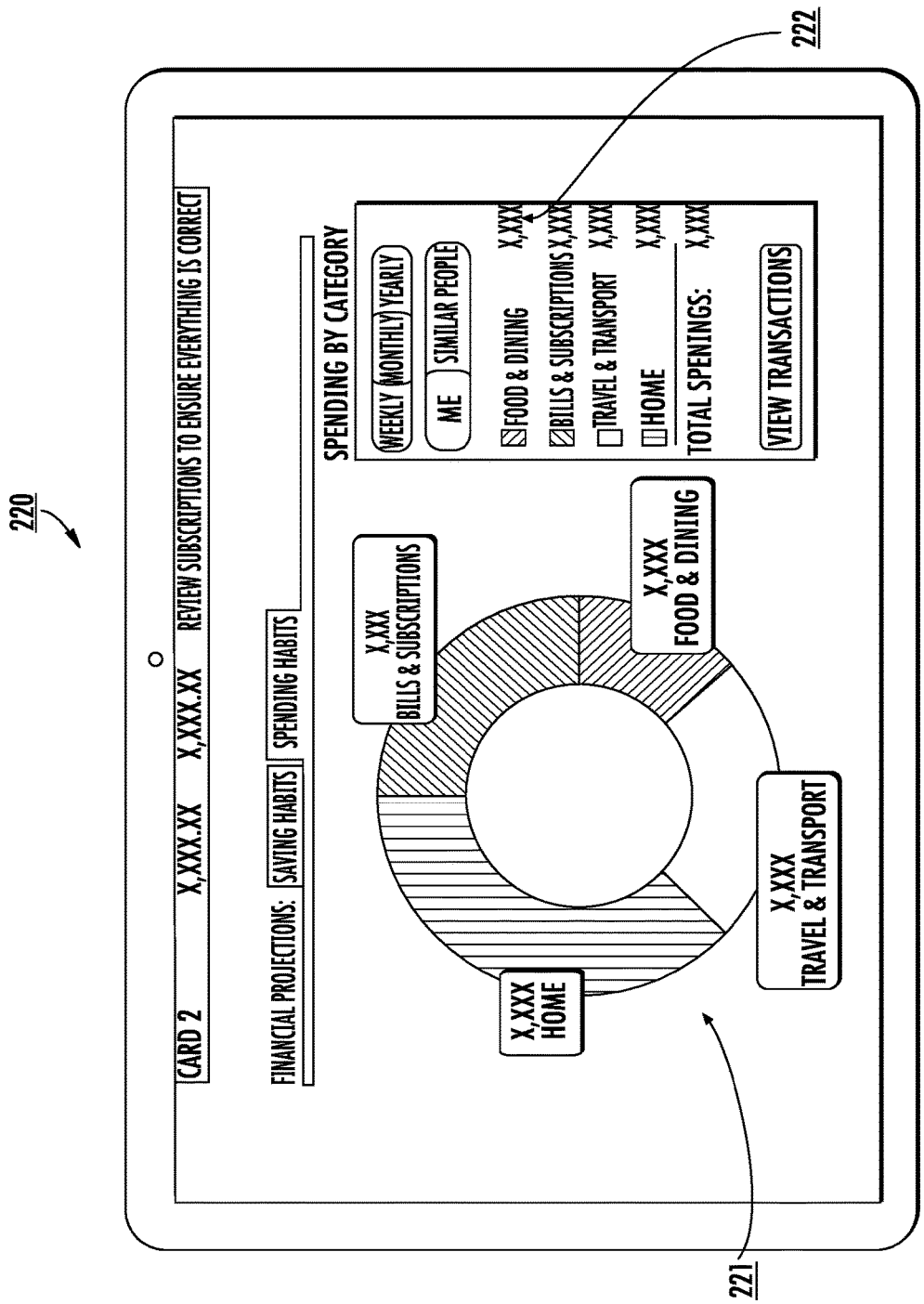
Figure 2D:
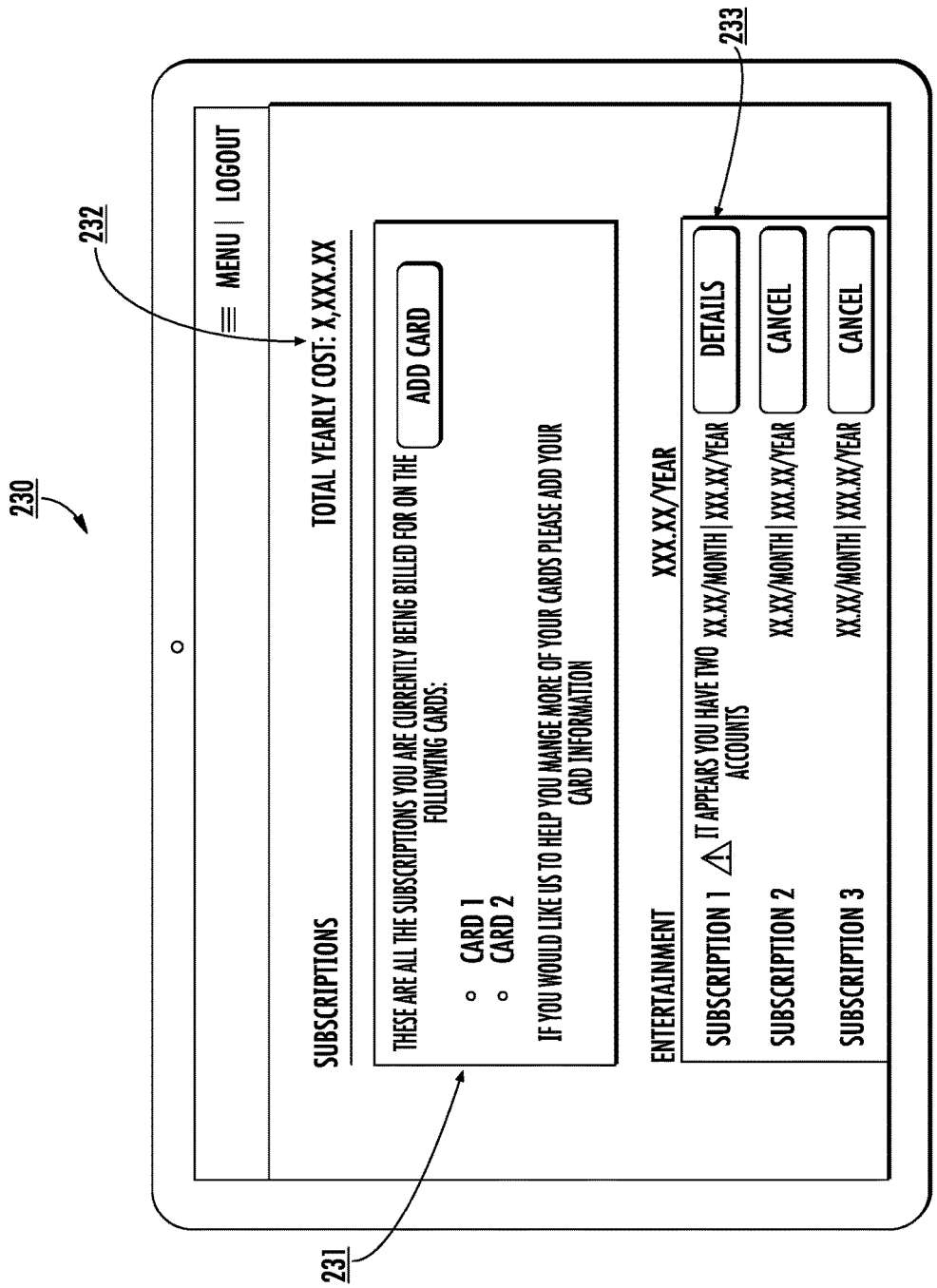
Figure 3:
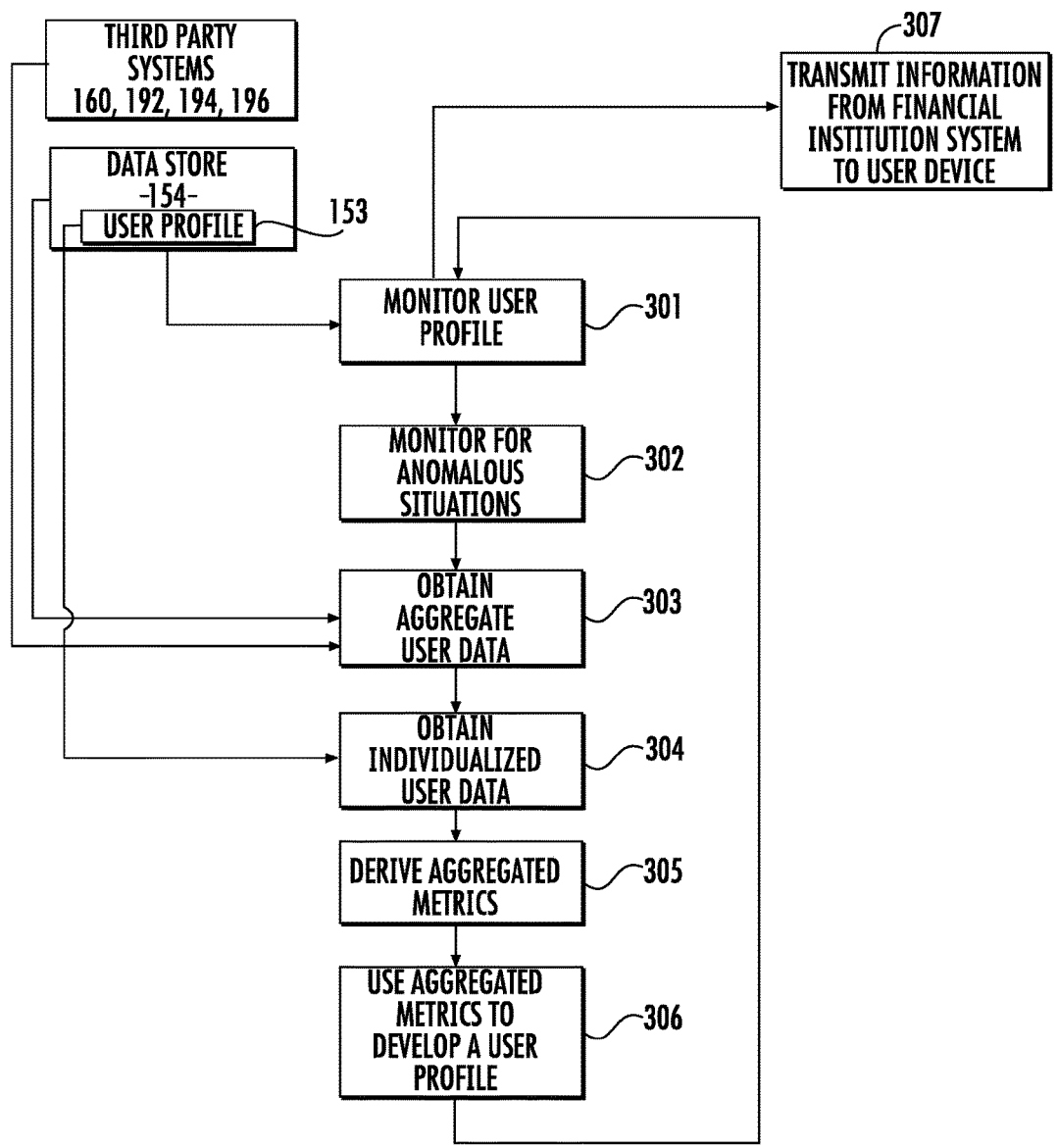

Having thus described embodiments of the invention in general terms, reference will now be made to the accompanying drawings, wherein:

FIG. 1 provides a system environment in which embodiments of the invention operate, in accordance with one embodiment of the present invention;

FIG. 2A illustrates a graphical representation of a portion of a banking application user interface, in accordance with some embodiments of the invention;

FIG. 2B illustrates a graphical representation of a portion of a banking application user interface for monitoring asset savings, in accordance with some embodiments of the invention;

FIG. 2C illustrates a graphical representation of a portion of a banking application user interface for monitoring asset spending, in accordance with some embodiments of the invention;

FIG. 2D illustrates a graphical representation of a portion of a banking application user interface for monitoring subscriptions, in accordance with some embodiments of the invention;

FIG. 3 is a block diagram illustrating an embodiment of a method of operation of the system.

Figure 4:
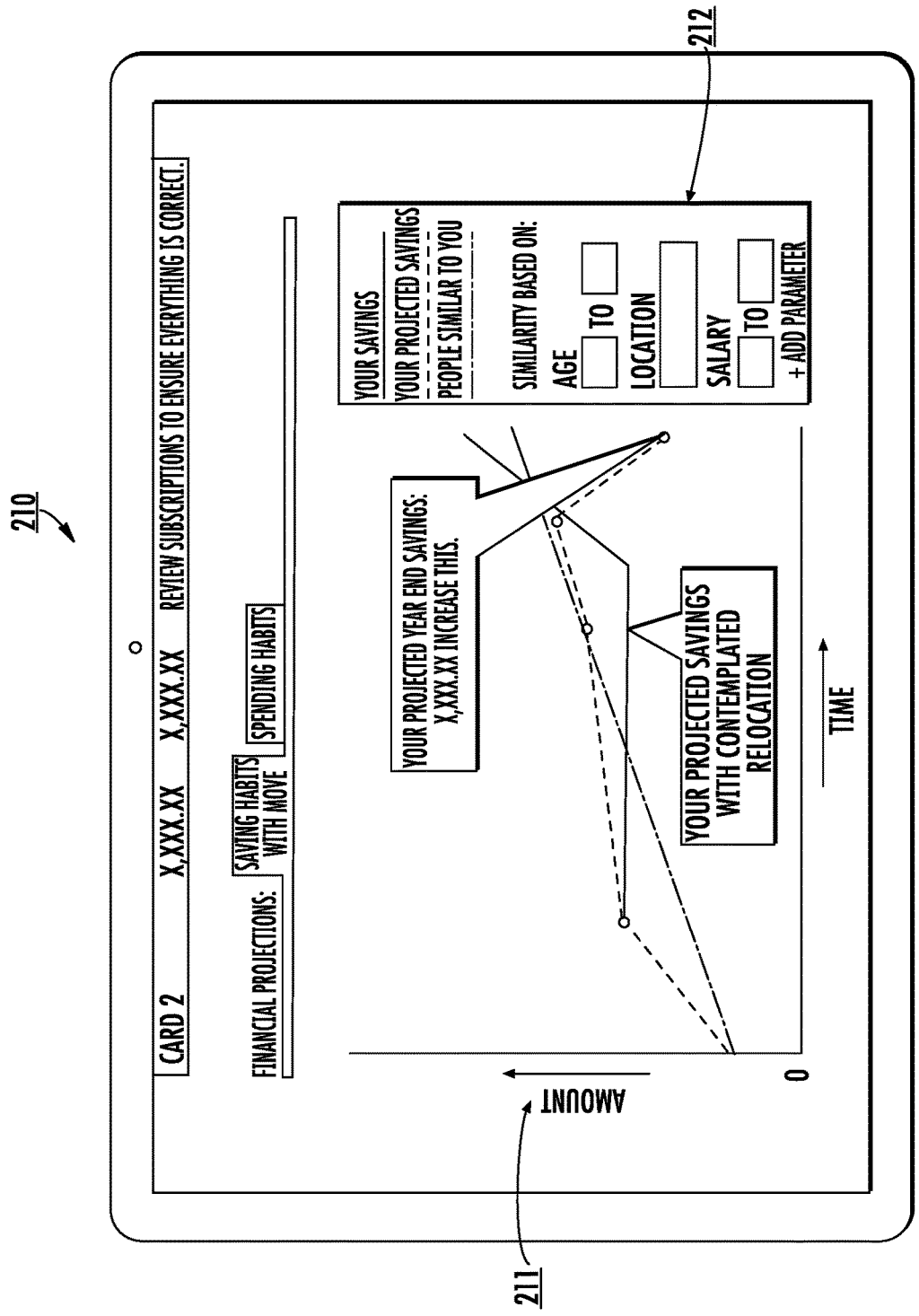
Figure 5:
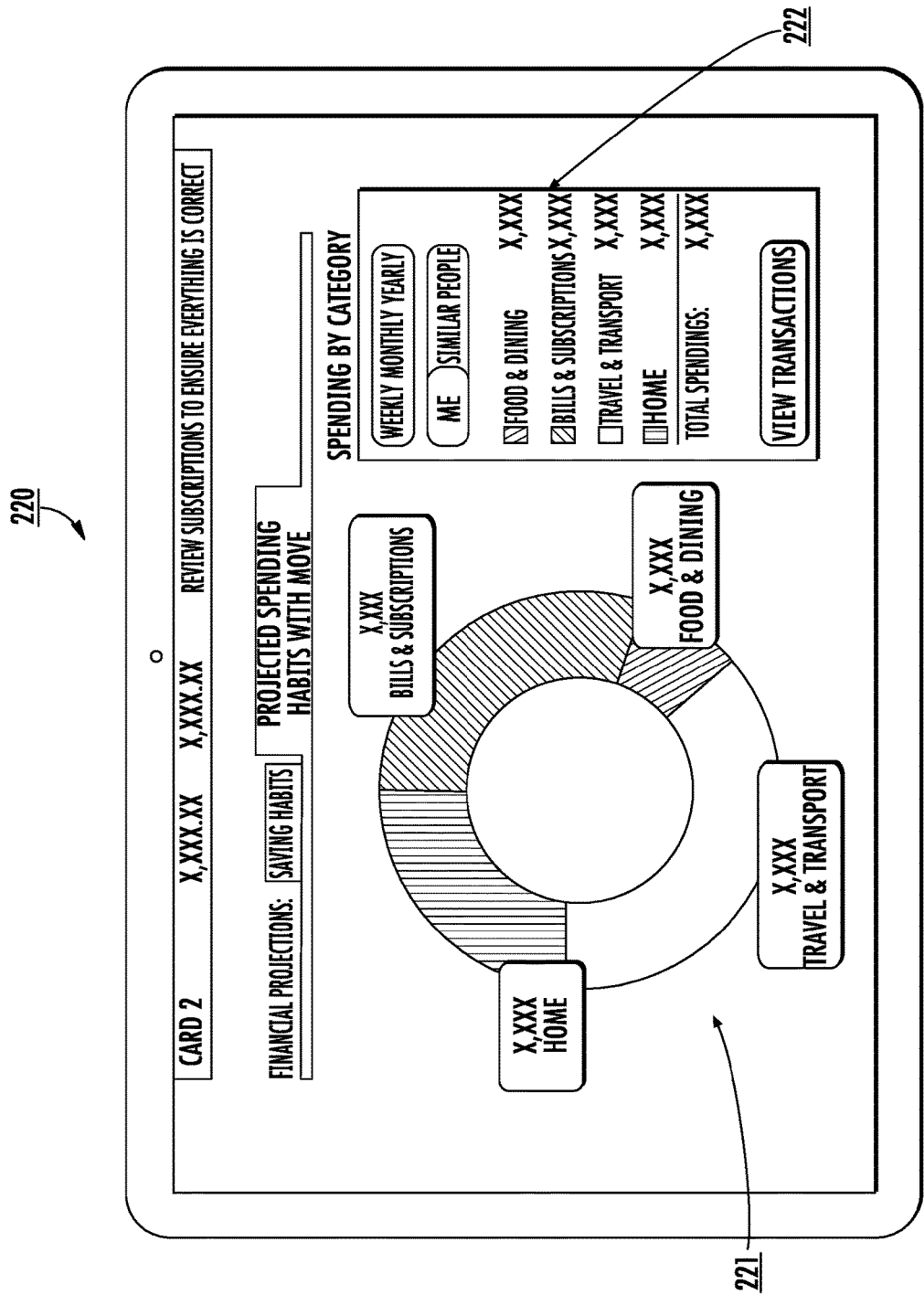

FIG. 4 illustrates a graphical representation of a portion of a banking application user interface for monitoring asset savings in an anomalous situation, in accordance with some embodiments of the invention;

FIG. 5 illustrates a graphical representation of a portion of a banking application user interface for monitoring asset savings in an anomalous situation, in accordance with some embodiments of the invention.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. "Assets" include accounts of the user and/or other property owned by the user. The assets may be associated with accounts or may be property that is not associated with a specific account. Examples of assets associated with accounts may be accounts that have cash or cash equivalents, or accounts that are funded with or contain property, such as safety despots box account that jewelry, a trust account that is funded with property, or the like. Examples of assets that may not be associated with accounts may be antiques in a user's home, jewelry in a user's home, or the like. "Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. An "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. A "financial event" or "life event" may be any immediate or future event that causes a change in a user's financial status. A financial event may be a charge, a transaction, and exchange, or the like that may cause the user to lose or gain money and/or assets. Examples of financial events or life events include a medical expense, buying a house, college tuition, rent, moving to a new city, receiving a raise or bonus in pay and the like. To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information. A "transaction" refers to any communication between a user and the financial institution or other entity monitoring the user's activities. A transaction may also refer to any communication between a user and a third party. For example, a transaction may refer to a purchase of goods or services, a return of goods or services, a payment transaction, a credit transaction, or other interaction involving a user's account. In the context of a financial institution or third party, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or or leasing goods and/or services (e.g., groceries, stamps, tickets, DVDs, vending machine items, digital items and the like); making payments to creditors (e.g., paying monthly bills; paying federal, state, and/or local taxes; and the like); sending remittances; loading money onto stored value cards (SVCs) and/or prepaid cards; donating to charities; and/or the like. A "user" may be a financial institution customer (e.g., an account holder or a person who have an account (e.g., banking account, credit account, or the like)). In one aspect, a user may be any financial institution customer involved managing spending and accounts with the financial institution or any other affiliate entities associated with the financial institution. In some embodiments, the user may be an individual who may be interested in opening an account with the financial institution. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably. A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Referring now to FIG. 1, the figure illustrates a processing system environment 100, in accordance with some embodiments of the invention. The environment 100 includes a user device 111 associated or used with authorization of a user 110 (e.g., an account holder, a mobile application user, a bank customer, and the like), a third party system 160, and a financial institution system 140. In some embodiments, the third party system 160 corresponds to a third party financial institution. The environment 100 further includes one or more third party systems 192 (e.g., a partner, agent, or contractor associated with a financial institution), one or more other financial institution systems 194 (e.g., a credit bureau, third party banks, and so forth), and one or more external systems 196.

The systems and devices communicate with one another over the network 130 and perform one or more of the various steps and/or methods according to embodiments of the disclosure discussed herein. The network 130 may include a local area network (LAN), a wide area network (WAN), and/or a global area network (GAN). The network 130 may provide for wireline, wireless, or a combination of wireline and wireless communication between devices in the network. In one embodiment, the network 130 includes the Internet.

The user device 111, the third party system 160, and the financial institution system 140 each includes a computer system, server, multiple computer systems and/or servers or the like. The financial institution system 140, in the embodiments shown has a communication device 142 communicably coupled with a processing device 144, which is also communicably coupled with a memory device 146. The processing device 144 is configured to control the communication device 142 such that the financial institution system 140 communicates across the network 130 with one or more other systems. The processing device 144 is also configured to access the memory device 146 in order to read the computer readable instructions 148, which in some embodiments includes one or more applications such as applications 150 and 151. The memory device 146 also includes a datastore 154 or database for storing pieces of data that can be accessed by the processing device 144.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, or 164 may further include functionality to operate one or more software programs based on computer-executable program code thereof, which may be stored in a memory. As the phrase is used herein, a processing device 114, 144, or 164 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 146 includes any computer memory that provides an actual or virtual space to temporarily or permanently store data and/or commands provided to the processing device 144 when it carries out its functions described herein.

The user device 111 includes a communication device 112 communicably coupled with a processing device 114, which is also communicably coupled with a memory device 116. The processing device 114 is configured to control the communication device 112 such that the user device 111 communicates across the network 130 with one or more other systems. The processing device 114 is also configured to access the memory device 116 in order to read the computer readable instructions 118, which in some embodiments includes application 120 and online banking application 121. The memory device 116 also includes a datastore 122 or database for storing pieces of data that can be accessed by the processing device 114. The user device 111 may be a mobile device of the user 110, a bank teller device, a third party device, an automated teller machine, a video teller machine, or another device capable of capturing a check image.

The user device 111 further includes a user interface 131 that allows input from the user to the user device and output from the user device to be displayed to the user. As used herein, a "user interface" 130 generally includes a plurality of interface devices and/or software that allow a customer to input commands and data to direct the processing device to execute instructions. For example, the user interface 131 presented in FIG. 1 may include a graphical user interface (GUI) or an interface to input computer-executable instructions that direct the processing device 114 to carry out specific functions. The user interface 131 employs certain input and output devices. These input and output devices may include a display, mouse, keyboard, button, touchpad, touch screen, microphone, speaker, LED, light, joystick, switch, buzzer, bell, and/or other user input/output device for communicating with one or more users. The banking application interfaces shown in FIGS. 2A through 8 may be displayed on user interface 131 such as on a touch screen display.

The third party system 160 includes a communication device 162 communicably coupled with a processing device 164, which is also communicably coupled with a memory device 166. The processing device 164 is configured to control the communication device 162 such that the third party system 160 communicates across the network 130 with one or more other systems. The processing device 164 is also configured to access the memory device 166 in order to read the computer readable instructions 168, which in some embodiments includes an application 170. The memory device 166 also includes a datastore 172 or database for storing pieces of data that can be accessed by the processing device 164.

In some embodiments, the application 120, the online banking application 121, and the application 170 interact with the application 150 or 151 to receive or provide financial data, analyze financial record data, and implement business strategies, transactions, and processes. The applications 150 and 151 may be a suite of applications for performing these functions.

In some embodiments, the application 120, the online banking application 121, and the application 170 interact with the applications 150 and 151 to utilize metadata to determine decisions for processing.

The applications 120, 121, 150, 151, and 170 are for instructing the processing devices 114, 144 and 164 to perform various steps of the methods discussed herein, and/or other steps and/or similar steps. In various embodiments, one or more of the applications 120, 121, 150, 151, and 170 are included in the computer readable instructions stored in a memory device of one or more systems or devices other than the systems 160 and 140 and the user device 111. For example, in some embodiments, the application 120 is stored and configured for being accessed by a processing device of one or more third party systems 192 connected to the network 130. In various embodiments, the applications 120, 121, 150, 151, and 170 stored and executed by different systems/devices are different. In some embodiments, the applications 120, 121, 150, 151, and 170 stored and executed by different systems may be similar and may be configured to communicate with one another, and in some embodiments, the applications 120, 121, 150, 151, and 170 may be considered to be working together as a singular application despite being stored and executed on different systems.

In various embodiments, one of the systems discussed above, such as the financial institution system 140, is more than one system and the various components of the system are not collocated, and in various embodiments, there are multiple components performing the functions indicated herein as a single device. For example, in one embodiment, multiple processing devices perform the functions of the processing device 144 of the financial institution system 140 described herein. In various embodiments, the financial institution system 140 includes one or more of the external systems 196 and/or any other system or component used in conjunction with or to perform any of the method steps discussed herein. For example, the financial institution system 140 may include a financial institution system, a credit agency system, and the like.

In various embodiments, the financial institution system 140, the third party system 160, and the user device 111 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

Referring now to FIG. 2A, the figure illustrates a graphical representation of a portion of a banking application user interface 200, in accordance with some embodiments of the invention. In some embodiments, the banking application is the online banking application 121. The user interface allows the user to input information, such as commands or data, into a device, and allows the device to output information to the user. As illustrated in FIG. 2A, in some embodiments, the application presents the user with means for navigating the interface by providing a menu 201. The menu 201 may be a drop-down menu which provides the user with additional interactive selections for navigation within the application. Furthermore, the menu provides a logout option which allows the user to exit the application. Upon logging out or initially launching the application, the user may be prompted by the application to provide authentication information to log in. In some embodiments, the application may provide the user, via the user interface, with information related to one or more accounts associated with the user such as bank accounts 202, credit card accounts 203, and the like. The application my additionally provide alerts 204 to the user such as alerts regarding savings goals, budgets, offers for goods or services and the like. In some embodiments, the alerts may be in-line with the account information associated with the user or even be presented along with individual transactions. In some embodiments, the user may optionally toggle the appearance of alerts so that they may or may not be displayed via the user interface.

Referring now to FIG. 2B, the figure illustrates a graphical representation of a portion of a banking application user interface for monitoring asset savings 210, in accordance with some embodiments of the invention. As illustrated by element 211, the application presents to the user, via the user interface, a projection of asset savings by monitoring financial information associated with the one or more user accounts. In some embodiments, the projection is presented to the user via a graph, chart, or the like, wherein the user may modify the scale of time of the record to reflect weekly, monthly, yearly spending or the like. Additionally, the application may provide the user with one or more actionable alerts to allow the user to modify his or her saving habits. Furthermore, the application may present asset saving habits and projections for other users determined to be similar to the user. In some embodiments, the application provides one or more interactive fields 212 for the input of parameters used determine the other similar users, such as age, location, salary, and the like.

Referring now to FIG. 2C, the figure illustrates a graphical representation of a portion of a banking application user interface for monitoring asset spending 220, in accordance with some embodiments of the invention. As illustrated by element 221, the application presents to the user, via the user interface, a record of asset spending by monitoring financial information associated with the one or more user accounts. In some embodiments, the record is presented to the user via a graph, chart, or the like, wherein the user may modify the scale of time of the record to reflect weekly, monthly, yearly spending or the like. Additionally, the application may provide the user with one or more actionable alerts to allow the user to modify his or her spending habits. Furthermore, the application may present asset spending habits and projections for other users determined to be similar to the user. In some embodiments, the application provides one or more interactive fields 222 for the input of parameters used determine the other similar users, such as age, location, salary, and the like.

Referring now to FIG. 2D, the figure illustrates a graphical representation of a portion of a banking application user interface for monitoring subscriptions 230, in accordance with some embodiments of the invention. As illustrated by element 231, the application user interface displays credit cards, debit cards, payment accounts, and the like used for the payment of one or more subscriptions associated with the user. Additionally, the user is presented with a total cost of the one or more subscriptions associated with the user 232. As illustrated by element 233, the user interface may present the one or more subscriptions to the user and provide actionable alerts to the user such as alerts that identify duplicate subscriptions associated with the user. The application may present additional details associated with the one or more subscriptions such as cost, sign-up date, renewal data, and the like.

All or a selected part of the user accounts, assets, transactions, financial and life events may together be considered a user profile. In some embodiments the user profile is based on the user's regularly occurring financial activities and transaction history. The financial institution may have access to a user's assets, transactions, financial and life events, savings history, debt, credit/debit card usage or the like that may be stored in data store 154. For example, the user profile may include data relating to income where the user may earn a regular income stream that is known to the financial institution such as such as through the deposit of a paycheck to a user account with the financial institution. The user profile may include data relating to the user's monthly expenses based on credit/debit card usage, autopay information, checking account payments, cash withdrawls, loan information, such as auto loans, mortgages, checking accounts, and the like. The financial institution is able to monitor the user's financial activity from this data.

The financial institution may also have access to aggregated data for other individuals that also have a relationship with the financial institution including individuals that are similarly situated to the user. The aggregated data for the performance and financial activity of other individuals may include, but is not limited to, average or typical savings rates, average or typical assets, debt amounts, debt to savings ratios, debt to income ratios and the like. The financial institution may also have access to other economic data such as cost of living for the locale of the user, financial instruments available to the user, interest rates, tax rates or the like.

The aggregated data from all of the individuals having a relationship with the financial institution and other macroeconomic and microeconomic data may be used to provide or inform a financial plan for a particular user. The user and the financial institution may develop a financial plan for the user. The financial plan may include financial goals or targets such as goals for savings, reducing debt, lowering expenses, improving a credit score, or the like. The goals and targets may be of a general nature such as to save increase savings by a desired amount over the next twelve months. The goals and targets may be specific such as to save a particular amount for purchasing a car or vacation. The goals may be relative such as to save 10% more than other similarly situated individuals or to increase savings 10% year over year. The goals and targets may also be transaction or account specific. For example, the goal or target may be to increase the balance in a particular account such as a retirement account by a certain amount per year. Each user may have one or more goals or targets as part of their individual financial plan and the goals and targets may be mixed and modified in a variety of ways depending upon the user's financial circumstances.

Once the goals and targets are established the financial institution monitors the user's actual financial performance and provides feedback in the form of reports, alerts or the like that provide information to the user as to the relationship between the user's actual financial performance and the user's financial plan as illustrated in FIGS. 2A-2D. The reports may be used by the user to maintain a desired performance, to modify performance and/or to set a new or modified financial plan. The financial plan may be considered to be a part of the user profile that also includes the user's assets, transactions, financial and life events, savings history, debt, recurring debt, credit/debit card usage or the like Because the financial institution has access to the aggregated data of individuals with which the financial institution has a relationship that may be stored in data store 154, the financial institution may provide information to the user based on the aggregated data in addition to the user's individual data. For example, the financial institution may provide information to the user regarding comparisons of the user's individual performance to the aggregated user data. Moreover because the financial system has access to other economic data such as from third party system 160, other systems 192, other financial institutions systems 194 and external systems 196, the financial institution may provide information to the user regarding investment opportunities, new financial instruments, and the like.

In addition to monitoring and tracking the user's actual performance the system may also provide forward looking information to the user in the form of trends, predictive analysis and the like (see for example FIG. 2B). This forward looking information may be based on the historical data of the user and the other data of the financial institution. For example, the system can estimate the user's total savings at the end of a financial period based on the user's historical deposit/savings rate and the interest provided by the savings account. The forward looking information or trends may be provided to the user to inform the user of the user's future financial outlook.

In the system of the invention, the development of the user profile and financial plan and the monitoring of the user's performance relative to the financial plan may also incorporate financial anomalies into the analysis. The term "financial anomaly" refers to a financial event or life event related to the user that is outside of the known historical data or the normal predictive analysis for that user. A financial anomaly may be considered a relatively rare occurrence and may be a one-time occurrence. Moreover, the financial anomaly may be a predicted or expected future occurrence. An example of a financial anomaly may be a fiscal anomaly such as an inheritance, an unusually large bonus, a significant gift, an unexpected expense, a sudden change in the user's assets or other financial event. Another example of a financial anomaly may be a life event anomaly where a life event of the user creates the anomaly. For example, a life event anomaly may be a situation where the user is living in a first location but is planning a future move to a second location where the second location has significantly different financial climate, cost of living or the like than the first location. For example, a young person may be planning a move to a city with a significantly higher cost of living or a senior person may be planning to retire in a location, such as another country, with a significantly lower cost of living than the user's current cost of living. These anomalies, whether occurring in the past or predicted to occur in the future may significantly affect a user's financial situation where the anomaly may not be included in the user's existing financial plan.

Where the data related to the anomaly is known to within a degree of certainty it may be incorporated in the analysis of the user's financial plan in a manner similar to historical data. For example, if the user can predict a future bonus with a degree of certainty, that bonus may be incorporated into the user's financial plan. For example, if the plan calls for 50% of the bonus to be deposited into savings and the amount of the bonus is within a known range, the deposit may be incorporated into the plan when determining the forward looking performance of the user such as illustrated in FIG. 2B.

However, when the anomaly is not known with a degree of certainty or where the anomaly is outside of the ability of the user to easily or accurately assess the anomaly, the system of the invention uses aggregated metrics to indicate the future circumstances such that the user's profile can incorporate the anomaly. For example, in the situation where a user is planning a move from a first location to a second location in two years, the system may incorporate the life event anomaly (the move) when preparing and monitoring the user profile and financial plan even where the user has no or incomplete individualized data regarding the new location. For example, the life event of a move to a new location may create an anomalous situation such as a significantly higher or lower cost of living, a significantly different tax structure, a significantly different home ownership level, significantly different average incomes and/or combinations of these and other such situations. While a specific life event anomaly of a move and specific set of anomalous circumstances are identified, the anomaly may be other than a move and the anomalous circumstances may be others than those listed herein.

The move is considered a life event anomaly because the historical data for the user and the financial circumstances surrounding the user's current life situation are different than the user's future life circumstances. As a result, setting a financial plan relying on the user's present life circumstances and conditions may be inaccurate for the user's future life circumstances. Moreover, the future circumstances and conditions may not be completely known or easily or accurately predicted by the user. The system of the invention uses the aggregated data of any individual or other entity to whom the financial institution system 140 has access in order to create an aggregated metric or metrics that may then be used to set the financial plan or profile of the user for the anomalous situation. As used herein aggregated data refers to the data available to the system of the invention. Aggregated metrics refer to the specific pieces of information developed from the aggregated data that are used in implementing the system of the invention. In some embodiments, the aggregated metrics may be considered a relevant subset of the available aggregated data. For example, the system of the invention can access and monitor the financial data of individuals that may currently be in the future circumstance of the user and aggregate this data to define aggregated metrics that may be used to indicate the future user circumstances. Thus, in the example where the user is contemplating a move to a new and financially different location, the system of the invention can aggregate the data for individuals in the new location and develop and use the aggregated metrics to indicate a financial plan and/or user profile for the user without the user having to identify all of the potential changes in the user's situation and without relying solely on historical data of the user. While the system uses the aggregated metrics of the financial institution's other customers in setting the user's financial plan and/or user profile, the system may also incorporate the user profile and the user's individual data. Thus, in the example embodiment of a user's future move to a new location, the financial institution system 140 may incorporate the aggregated metrics for inputs such as expenses (e.g. rent, utilities, taxes, transportation, entertainment) in the new location or other aggregated data such as average saving rates, average 401k contributions and the like. These metrics are obtained from the aggregated data of the financial institution's other customers where for example the actual cost of living of individuals living in the new location may be calculated from the aggregated data. The aggregated metrics may also include average rent, average taxes, average transportation costs, average entertainment expenses, average savings or the like for people similarly situated to the user in the new location. The system may also incorporate individualized historical data of the user such as the user's savings rate relative to average, the user's expenses relative to average and the like. The system uses the individual user data to customize the aggregated metrics such that the system may predict the user's financial situation in the new location. For example, if the aggregated metrics for savings in the new location is 10% of income per year and the user's individualized historical data shows the user saves 10% more than average, the system may predict that the user will save 11% of income in the new location. This analysis may be performed with respect to any metric that is affected by the anomaly such that the system may create a forward looking financial plan and user profile incorporating the anomaly.

For example, where the user has a financial goal or target such as saving 10% of income and the user plans to move to a new location with a different cost of living, the system of the invention can use relevant aggregated metrics for the new location and relevant historical data of the user to create a user profile and financial plan specific to the user that accounts for both the user's current circumstances and the anomaly of the move. The system, in conjunction with input from the user, can, for example, create a financial plan that incorporates the anomaly (the move) to achieve the targeted savings. The financial plan may adjust the user's targeted savings in the years prior to the move to account for changes in circumstances for the years after the move such that the user's goals and targets may be met over the term of the financial plan. For example, if the new location has a higher cost of living than the current location, the plan may adjust the targeted savings in the current location upward to offset the increase in the future increase in the cost of living. To develop the targets the system uses the aggregated metrics to establish the actual cost of living for similarly situated individuals in the new location where the metrics may be selected based on demographics of the selected individuals such as age, income, living situation, assets or the like. The metrics may be further modified by the user's historical financial data based on the user's individual savings history, spending history, expense history and the like such that the expenses and cost of living in the new location may be adjusted to account for the user's actual historical financial performance relative to similarly situated individuals. The system may also be used to set the financial plan as if the user was in the new location such that the system may simulate the change in circumstances and the user may virtually experience the change in financial circumstances before the move is actually made.

In other embodiments the anomaly may comprise a change in income. For example, the user may be a college student where after graduation the user may be entering a relatively high paid field or a relatively low paid field. Another example of an anomaly that may result in a significant change in income may be where the user, as part of their life plan, intends to take a year off of work in midcareer. In yet another example embodiment the anomaly that may result in a significant change in income may be where the user intends to retire in the future. The system of the invention uses the aggregated metrics of any data the system has access to set the financial plan of the user for the anomalous financial and/or life event. For example, the system of the invention can monitor the financial information of individuals that may are in the anomalous situation of the user and aggregate this data to develop aggregated metrics to indicate the future user circumstances. Thus, for example, when the user is facing a prospective significant change in income, the system of the invention can aggregate the data for individuals with similar incomes and use the developed aggregated metrics to set the financial plan for the user without the user having to identify all of the changes in circumstances and without having to rely solely on historical data of the user. While the system uses the aggregated metrics of the financial institution's customers in setting the user's financial plan and/or user profile, the system may also incorporate the user's individual historical data. Thus, the system may incorporate the aggregated metrics for inputs such as expenses (e.g. rent, taxes, transportation, entertainment or the like) for individuals in the new location and/or savings (e.g. average saving rates, average 401k contributions and the like) and individualized historical data (e.g. the user's entertainment expenses relative to average, the user's savings rate relative to average and the like). In this manner the system of the invention can incorporate anomalies in the user's present financial plan to provide a current financial plan and/or user profile that accounts for the anomaly.

For example, where the user has a financial goal or target saving for a purchase such as a new home and the user has a life and/or financial event of a significant income change, the system of the invention can use the aggregated metrics for the new income and relevant historical data of the user to create a financial plan specific to the user that accounts for both the user's current circumstances and the anomaly. The system, in conjunction with input from the user, can, for example, create a financial plan to save the desired amount that incorporates the anomaly such that the financial plan may adjust user profiles in the years prior to the income change to account for changes in circumstances for the years after the income change such that the user's goals and targets may be met. For example, if the income change results in a significantly higher income than the user's current income, the plan may adjust the current savings downward and plan on future savings to offset the lower current savings. Conversely, if the income change results in a significantly lower income than the user's current income, the plan may adjust the current savings upward to offset the lower future savings. Thus, the system may incorporate the aggregated metrics for inputs such as expenses (e.g. rent, taxes, transportation, entertainment or the like) and/or savings (e.g. average saving rates, average 401k contributions and the like) for individuals with the prospective income and individualized historical data (e.g. the user's entertainment expenses relative to average, the user's savings rate relative to average and the like). In this manner the system of the invention can incorporate anomalies in the user's present earnings to provide a current financial plan and/or user profile that accounts for the anomaly.

Another example of an anomaly may comprise a significant prospective asset change. One example of such a prospective asset change is an inheritance. Like the other situations discussed above, the anomaly results in a change in the user's financial situation that may affect the financial plan and/or user profile where the anomaly may be prospective, or inchoate and the precise financial details may not be presently known. In the case of a significant asset change the effect on the user's financial plan may impact savings rates, tax planning, expenses, investment portfolio mix, risk assessment and/or the like. The system of the invention uses aggregated user metrics derived from individuals that are similarly situated to the anomalous situation of the user to modify the user's financial plan in accordance with the anomalous change in assets. Where the change in assets has occurred in the past the system of the invention incorporates the change in assets as part of the user's historical record. However, the system of the invention may use the aggregated metrics developed from the aggregated data to prospectively incorporate the change in assets. In such a situation the system of the invention uses the aggregated metrics to modify the user's financial plan even where the precise financial details of the asset change may not be known. For example, with an inheritance the system may look at aggregated metrics to determine the potential timing of an inheritance, the potential value of the inheritance, tax burden or the like. The system may consider the user data for individuals that are similarly situated to both the beneficiary and benefactor of the inheritance. The system may also account for the user's individualized historical data (e.g. the user's expenses relative to average, the user's savings rate relative to average and the like) to modify the aggregated metrics. In this manner the system of the invention can incorporate anomalies in the user's assets to provide a current financial plan and/or user profile that accounts for the anomaly. The change in assets may result from life events other than an inheritance such as a potential sale of undeveloped real estate, health care related expenses or the like.

In these and other embodiments, the aggregated data accumulated by the financial institution is used to provide the aggregated metrics that represent the anomalous situation. The aggregated metrics are used in conjunction with the user's individualized historical data and other financial data available to the financial institution to provide a financial plan and/or user profile that is individually tailored to the user.

Referring to FIG. 3, one embodiment of a method of the invention will be described where the user's user profile 153 including for example, the user financial plan, historical data, transaction history and the like is saved in data store 154 of the financial institution system 140. The system is able to access the user profile 153 including historical data such as transaction history, accounts, assets, financial events and life events. The system monitors the user profile including transaction history, account information and the like to update the user's financial plan and to provide updated output on user device 111 as illustrated in FIGS. 2A-2D (Block 301). The system of the invention creates a financial plan for the user based on the user's financial goals and targets, behavior patterns, financial data such as account information, assets and the like that may be considered part of the user profile. The financial plan utilizes information provided by the user (e.g. target savings) and information retained or accessed by the financial institution system (e.g. savings account interest rate) to create the financial plan. Thus for example, the system may track income, expenses, savings history, projected savings, actual savings relative to goal, savings compared to other similarly situated individuals or the like. The financial plan is retained and updated by the financial plan application 150 that monitors the user behavior and updates the user's financial history and that updates other financial data such as interest rates. The financial plan application 150 may transmit information from the financial entity system 140 to the user on user device 111 as illustrated in FIGS. 2A-2D as previously described (Block 307)

The system also monitors for anomalies in the user's situation (Block 302). The anomaly may be received by the financial institution system 140. The anomaly may be transmitted by the user from user device 111 to the financial institution system 140. The anomaly may also be received by the financial institution system 140 from the user other than from user device 111. The anomaly may also be received by the financial institution system from a third party system 160, 192, other financial institution system 194 and/or external system 196.

Upon receipt of information about the anomalous situation, the system of the invention obtains aggregated data related to the user's anomalous situation (Block 303). The aggregated data may be obtained from the data store 154 of the financial institution system 140 where the anomaly application 151 accesses information about other users stored in datastore 154. As previously explained the aggregated data may comprise data aggregated from the financial institution's own customers that are similarly situated to the user and the user's anomalous situation. In some embodiments, the aggregated data may be obtained from a third party system 160, 192, other financial institution system 194 and/or external system 196. For example, the aggregated data may comprise financial information such as cost of living about the location of a potential move, life expectancy, real property values, earnings potential of a profession or the like. In some embodiments the aggregated data may comprise both types of information where for example in the case of a relocation the information may comprise the cost of living of the new area obtained from a third party source and the savings habits of customers of the financial institution in that area. The anomaly application 151 may also obtain individualized user data from the user profile 153 as previously described (Block 304).

The anomaly application 151 derives aggregated metrics from the aggregated data and may use the individualized user data and other data as previously described (Block 305). AS previously explained aggregated metrics refer to the specific pieces of information developed from the aggregated data that are used in implementing the system of the invention. In some embodiments, the aggregated metrics may be considered a relevant subset of the available aggregated data. For example, the system of the invention can access and monitor the financial data of individuals that may currently be in the future circumstance of the user and aggregate this data to define aggregated metrics that may be used to indicate the future user circumstances. While the system uses the aggregated metrics of the financial institution's other customers in setting the user's financial plan and/or user profile, the system may also incorporate the user profile and the user's individual data. The system uses the individual user data to customize the aggregated metrics such that the system may predict the user's financial situation in the new location. This analysis may be performed with respect to any metric that is affected by the anomaly such that the system may create a forward looking financial plan and user profile incorporating the anomaly The aggregated data may then be used to analyze and/or project the user's financial activity (Block 306). Based on the user's targets and goals and financial history, the anomaly application 151 develops a financial plan and user profile that incorporates the anomalous circumstances. Using this financial plan the financial institution system 140 monitors the user activity and provides reports, alerts, trends as previously described. The information may be transmitted to user device 111 from financial institution system 140 as illustrated in FIGS. 4 and 5. FIG. 4 shows the user's projected savings with the anomalous situation of a relocation shown in the dark line and compared to the projected savings without the relocation shown in lighter line. FIG. 5 shows the user's projected spending with the move accounted for as compared to the spending of FIG. 2C prior to the move. In this manner the user may track the effects of the anomalous situation on the user's financial profile including financial plan, projections, trends and the like.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein. For example, a portion of one or more applications may be stored on the user device, or may be included as a portion of financial institution applications, such as an online banking application, in order to achieve embodiments of the inventions described herein.

It should be understood, that the systems and devices described in FIG. 1, or other devices not specifically described herein, may be configured to establish a communication link with each other in order to accomplish the steps of the processes described herein. The link may be an internal link within the same entity (e.g., within the same financial institution or device provider) or a link with the other systems of entities (e.g., social networking systems, third-party systems, or the like). In some embodiments, the systems may be configured for monitoring the applications and devices that the system(s) utilize as data sources. The information received from monitoring may be provided via wireless network path portions through the Internet. When the systems or devices are not monitoring a source or are not being monitoring, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data feeds from the various systems or devices, the system may be configured to provide target information to the user and/or allow the user to make changes to or control the applications and/or devices.

Moreover, it should be understood that the process flows described herein include transforming the information sent and/or received from the applications of the different systems (e.g., internally or externally) and/or the devices from one or more data formats into a data format associated with an application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/288,565 | LEVERAGING AN ARTIFICIAL INTELLIGENCE ENGINE TO GENERATE CUSTOMER-SPECIFIC USER EXPERIENCES BASED ON REAL-TIME ANALYSIS OF CUSTOMER RESPONSES TO RECOMMENDATIONS | Concurrently herewith |
| 15/288,797 | REAL-TIME DYNAMIC GRAPHICAL REPRESENTATION OF RESOURCE UTILIZATION AND MANAGEMENT | Concurrently herewith |
| 15/288,805 | SYSTEM FOR GENERATING USER EXPERIENCE FOR IMPROVING EFFICIENCIES IN COMPUTING NETWORK FUNCTIONALITY BY SPECIALIZING AND MINIMIZING ICON AND ALERT USAGE | Concurrently herewith |
| 15/288,826 | SYSTEM FOR AUTOMATICALLY ESTABLISHING OPERATIVE COMMUNICATION CHANNEL WITH THIRD PARTY COMPUTING SYSTEMS FOR SUBSCRIPTION REGULATION | Concurrently herewith |
| 15/288,833 | SYSTEM FOR AUTOMATICALLY ESTABLISHING AN OPERATIVE COMMUNICATION CHANNEL TO TRANSMIT INSTRUCTIONS FOR CANCELING DUPLICATE INTERACTIONS WITH THIRD PARTY SYSTEMS | Concurrently herewith |

What is claimed is:

1. An entity system for transmission and use of aggregated metrics, the entity system comprising:
    a network communication interface;
    a memory device storing an anomaly utilization application and a resource application;
    a processing device operatively coupled to the memory device, wherein the processing device is configured to execute computer-readable program code to:
        present a user profile on an application, wherein the user profile includes user accounts, assets, transactions, and financial events, wherein the financial events comprise a gain, loss, or exchange of assets;
        identify occurring financial activities and transaction history of the user and store the activities and transaction history in the user profile as historic financial practice data;
        identify existence of an anomalous situation for the user, wherein the anomalous situation is a financial event outside of the historic financial practice data of the user;
        acquire aggregated data from third parties about the anomalous situation, wherein the aggregated data further comprise metrics indicating a geographical location change of the user, wherein metrics comprise inputs from third parties comprising a cost of living of the geographic location change and aggregated financial practices of individuals residing in the geographic location; and
        display the anomalous situation for the user into the user profile on a display of a user device.

2. The system of claim 1, wherein the aggregated data is obtained from a third party system.

3. The system of claim 2, wherein the anomalous situation is transmitted to the entity system.

4. The system of claim 2, wherein the entity system is a financial institution system.

5. The system of claim 2, wherein the anomalous situation defines the set of individuals that are similarly situated to the user, wherein the set of individuals that are similarly situated to the user are individuals that have a same relationship with a financial institution, and average or typical savings rates as the user.

6. The system of claim 1, wherein the anomalous situation comprises at least one of a change in income, a change in assets, a change in expenses, and a physical move of the user.

7. The system of claim 1, wherein the aggregated data comprise the historical financial record of a plurality of third parties.

8. The system of claim 1, wherein the aggregated data is obtained by searching a datastore of the entity system for relevant information of individuals not related to the user individuals.

9. A method for transmission and use of aggregated metrics, the method comprising:
    presenting a user profile on an application, wherein the user profile includes user accounts, assets, transactions, and financial events, wherein the financial events comprise a gain, loss, or exchange of assets;
    identifying occurring financial activities and transaction history of the user and store the activities and transaction history in the user profile as historic financial practice data;
    identifying an existence of an anomalous situation for the user, wherein the anomalous situation is a financial event outside of the historic financial practice data of the user;
    acquiring aggregated data from third parties about the anomalous situation, wherein the aggregated data further comprise metrics indicating a geographical location change of the user, wherein metrics comprise inputs from third parties comprising a cost of living of the geographic location change and aggregated financial practices of individuals residing in the geographic location; and
    displaying the anomalous situation for the user into the user profile on a display of a user device.

10. The method of claim 9, further comprising obtaining the aggregated data from a third party system.

11. The method of claim 9, further comprising receiving the anomalous situation at the entity system.

12. The method of claim 9, wherein the entity system is a financial institution system.

13. The method of claim 9, further comprising defining a set of individuals that are similarly situated to the user based on the anomalous situation, wherein the set of individuals that are similarly situated to the user are individuals that have a same relationship with a financial institution, and average or typical savings rates as the user.

14. The method of claim 9, wherein the anomalous situation comprises at least one of a change in income, a change in assets, a change in expenses, and a physical move of the user.

15. The method of claim 9, wherein the aggregated data comprise the historical financial record of a plurality of third parties.

16. The method of claim 9, further comprising obtaining the aggregated data by searching a datastore of the entity system for relevant information of individuals not related to the user individuals.

* * * * *